United States Patent [19]
Fellers, Sr. et al.

[11] Patent Number: 6,017,399
[45] Date of Patent: *Jan. 25, 2000

[54] METHOD FOR CONTROLLING AND REMOVING SOLID DEPOSITS FROM A SURFACE OF A COMPONENT OF A STEAM GENERATING SYSTEM

[75] Inventors: Billy Dean Fellers, Sr., Glen Rose, Tex.; David M. Shenberger, Midway, Pa.

[73] Assignee: Calgon Corporation, Pittsburgh, Pa.

[ * ] Notice: This patent is subject to a terminal disclaimer.

[21] Appl. No.: 09/042,066

[22] Filed: Mar. 13, 1998

Related U.S. Application Data

[63] Continuation of application No. 08/570,799, Dec. 12, 1995, Pat. No. 5,779,814, which is a continuation of application No. 08/214,927, Mar. 17, 1994, abandoned.

[51] Int. Cl.[7] .............................. B08B 3/00; B08B 3/10; B08B 9/00; F23J 1/00
[52] U.S. Cl. ................... 134/20; 134/22.14; 134/22.19; 134/31; 134/37; 134/41; 134/42; 134/2; 134/3
[58] Field of Search ......................... 134/2, 3, 20, 22.14, 134/22–19, 31, 37, 41, 42

[56] References Cited

U.S. PATENT DOCUMENTS

| | | | |
|---|---|---|---|
| 3,549,538 | 12/1970 | Jacklin | 252/82 |
| 3,754,990 | 8/1973 | Teumac et al. | 134/2 |
| 4,632,705 | 12/1986 | Baum | 134/3 |
| 4,720,306 | 1/1988 | Emmert et al. | 134/3 |
| 4,808,235 | 2/1989 | Woodson et al. | 134/22.19 |
| 4,834,912 | 5/1989 | Hodgens et al. | 252/545 |
| 5,002,078 | 3/1991 | Kaes | 134/42 |
| 5,076,855 | 12/1991 | Kaes | 134/2 |
| 5,368,775 | 11/1994 | Rossi et al. | 252/392 |
| 5,779,814 | 7/1998 | Fellers, Sr et al. | 134/20 |

OTHER PUBLICATIONS

"High Pressure Boilers Feed Water Problems Deposition On Orifice Valves"—American Power Conference (Chicago, Apr. 21–24, 1975) Authored by P. Sturla.

"Use of Amines In Once–Through Steam Generator—An ENEL Experience On Steam–Water Cycle Treatment With Amines"—EPRI Workshop (Tampa, Florida, Sep. 25–27, 1990) Co–Authored by G. Quadri & G. Magnani—presented by M.A. Sadler.

"Separation Technology Requirements For Operation In The Amine Cycle With Deep Bed Condensate Polishing"—Presented at EPRI Workshop on Use of Amines in Conditioning Steam Water Circuits (Tampa, Florida, Sep. 25–27, 1990—Published Jul. 1991) co–authored by E. Salem & M. O'Brien.

*Primary Examiner*—Zeinab El-Arini
*Attorney, Agent, or Firm*—Webb Ziesenheim Logsdon Orkin & Hanson, P.C.

[57] ABSTRACT

A method for controlling and removing solid deposits from a surface of at least one component of a steam generating system, wherein the solid deposits are formed from an impurity introduced into the steam generating system, is disclosed.

18 Claims, 12 Drawing Sheets

BASELINE DATA

TURBINE AND STEAM DRUM SAMPLE DEPOSIT ANALYSES
EDS METHOD (WEIGHT %)

| ELEMENT | SAMPLE 1 | SAMPLE 2 | SAMPLE 3 |
|---|---|---|---|
| Na | TRACE | TRACE | – |
| Al | 15.17 | 13.11 | 3.27 |
| Si | 8.82 | 11.43 | 2.25 |
| P | TRACE | TRACE | 0.43 |
| S | 0.17 | 0.31 | 5.78 |
| Cl | 4.37 | 5.75 | 0.87 |
| K | 0.32 | 0.35 | – |
| Cr | 0.44 | 0.57 | 0.98 |
| Fe | 13.61 | 14.15 | 50.24 |
| Cu | 22.60 | 18.79 | 4.40 |
| Ni | – | – | 0.81 |
| O | 34.59 | 35.54 | 30.98 |

FIG. 6

HIGH PRESSURE TURBINE PERFORMANCE TESTING

|  | BEFORE DMA TREATMENT | DMA BOILER PHASE | DMA TURBINE PHASE |
|---|---|---|---|
| GROSS MWe | 380 | 377 (1) | 392 (2) |
| HP EXIT (psi) | 532 |  | 552 |
| IP INLET (psi) | 489 |  | 502 |
| 1st STAGE (psi) | 1973 |  | 1963 |
| FLOW (KLbm/h) | 3041 |  | 3033 |

(1) TURBINE LOSSES DUE TO STEAM CARRYOVER DURING BOILER PHASE (2) TURBINE GAINS DURING OFF-STREAM THERMAL CYCLING

DMA = DIMETHYLAMINE

MWe = MEGAWATT

HP = HIGH PRESSURE TURBINE

IP = INTERMEDIATE PRESSURE TURBINE

PSI = POUNDS PER SQUARE INCH

KLbm/h = KILO POUNDS OF MASS/HOUR

METHOD FOR CONTROLLING AND REMOVING SOLID DEPOSITS FROM A SURFACE OF A COMPONENT OF A STEAM GENERATING SYSTEM

This application is a continuation of application Ser. No. 08/570,799, filed Dec. 12, 1995, now U.S. Pat. No. 5,779,814, which is a continuation of U.S. patent application Ser. No. 08/214,927, filed Mar. 17, 1994, now abandoned.

BACKGROUND OF THE INVENTION

1. Field of the Invention

This invention relates to a method for controlling and removing solid deposits from a surface of a component of a steam generating system, wherein the solid deposits arise from impurities introduced into the steam generating system.

2. Brief Description of the Background Art

The fact that various salts are introduced as impurities into steam generating systems is well known by those skilled in the art. For example, condenser cooling water inleakage may be the greatest or most common source. Impurities may be introduced in the form of chemical additives, ion exchange media, welding residuals, grinding operations, desiccants and related construction/maintenance functions. These introduced impurities include, such as for example, but not limited to, calcium, magnesium, sodium, potassium, aluminum, chloride, silica, and sulfate, and insoluble salts such as, for example, but not limited to, calcium sulfate and aluminum silicate. These impurities are commonly reported as solids in the surface analysis of steam cycle materials.

The role and impact of introduced impurities include various debilitating corrosion mechanisms, particularly in the boiler and steam turbine systems. The most common known methods to minimize the effect of introduced impurities include exclusion and removal on ion exchange media. It is known by those skilled in the art that steam cycles are treated with alkalizing amines directed at maintaining alkalinity or pH control and reducing agents to promote passivation and minimize corrosion from impurities inherent in the steam generating system such as, for example, iron. EPRI, Workshop On Use Of Amines In Conditioning Steam/Water Circuits, "Use Of Amines In Once Through Steam Generators", authored by G. Quadri, et al., Tampa, Fla., U.S.A., September 1990, discloses the use of dimethylamine in utility fossil fueled power plant boilers in connection with the conventional manner of steam cycle alkalization, known by those skilled in the art, to reduce corrosion of ferrous materials.

The use of alkalizing amines to minimize corrosion caused by impurities inherent to the steam generating system is not generally compatible with the objective to minimize the formation of solid deposits arising from impurities introduced into the steam generating system. For example, maintenance of high alkalinity with alkalizing amines such as, for example, ammonia, limits monovalent cation such as, for example, sodium, removal on ion exchange systems such as, for example, condensate polishers. (Salem, E., "Separation Technology Requirements For Operation In The Amine Cycle With Deep Bed Condensate Polishing", from proceedings, workshop on Use Of Amines In Conditioning Steam/Water Circuits, EPRI, Tampa, Fla. September 1990). Therefore, it is often necessary to make a compromise between these two objectives. Prior to the instant invention, attempts to achieve both objectives were economically unattractive since the ion exchange system service life was shortened.

The literature clearly establishes the effect of introduced impurities on various corrosion processes or mechanisms. For example, caustic or acid forming species can preclude protective oxide stability, leading to catastrophic failure of materials, including corrosion resistant alloys. These materials are used in critical applications including steam generator tubing that provides the safety boundary in design of, such as for example, nuclear steam generators. The solid deposits that arise from impurities introduced into the steam generating system precipitate on the surfaces of the steam generating system forming scale. The accumulation of these solid deposits and scale prevents effective heat transfer, interferes with fluid flow of the water carrying system, and facilitates corrosive processes. These solid deposits formed by impurities introduced into the steam generating system is an expensive problem in many industrial applications such as, for example, the utility power industry, causing delays and shut downs for controlling and removing these solid deposits, and adding to the costs of operating and maintaining the steam plant operations. More specifically, these introduced impurities present similar issues on critical components of steam turbines and failures are common to nuclear and fossil fueled power plants. These failures include, for example, decrease in steam pressure and reduction in high pressure turbine output resulting in a decrease in energy output of the power plant, and turbine corrosion. Further, stress corrosion failures are common on turbine components and are caused, in part, by steam formed deposits including, for example, introduced impurities.

It is well known to those skilled in the art that the electrophoretic properties of steam formed solid deposits are typically not neutral. These deposits exhibit acid and base centres which give rise to catalytic properties and to selectivity for sorption of soluble ions such as, for example, $Na^+$ and $Cl^-$. Solids in alkaline systems usually exhibit acidity while those in acidic systems exhibit base properties. Further, some solid deposits such as, for example, alumina silicates, are known to exhibit bifunctional properties.

The acid strength and capacity of these solid deposits such as, for example, $Al_2O_3$ and $SiO_2$, are influenced by many factors including the molar ratio such as, for example, between alumina and silica, by the temperature at which the solid deposit is formed, by stress induced crystalline imperfections and by gamma irradiation.

It will be appreciated by those skilled in the art that the above mentioned background art does not teach or suggest the method of controlling and removing from the surface of a component of a steam generating system solid deposits formed from an impurity introduced into the steam generating system. Therefore, it will be understood by those skilled in the art that applicants have discovered unexpectedly that the method of the present invention comprising adding to an aqueous phase of a steam generating system an effective amount of at least one volatile amine having a pKa value greater than about 10.61 and providing thermal cycling results in controlling and removing solid deposits from the surface of a component of the steam generating system that are superior to results of others previously achieved.

In spite of this background material, there remains a very real and substantial need for a method of controlling and/or removing solid deposits arising from introduced impurities from the surface of a component of a steam generating system.

BRIEF DESCRIPTION OF THE FIGURES

FIG. 6 shows turbine and steam drum sample deposit analyses, prior to employing the method of the instant invention.

FIG. 13 shows the improvement in high and intermediate pressure turbine performance when employing the method of the instant invention.

SUMMARY OF THE INVENTION

Figure 1:
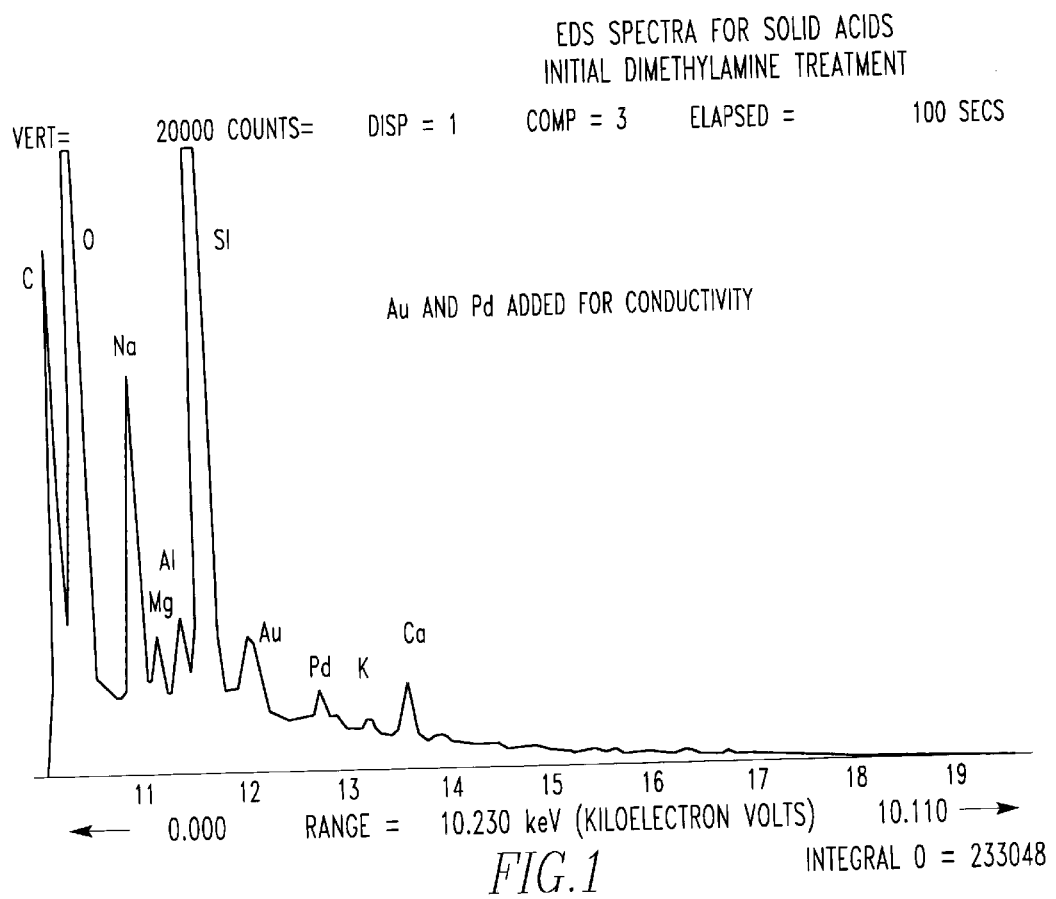
FIG. 1 shows the Electron Dispersive Spectroscopy spectra for solid acid deposits collected by sampling during initial dimethylamine addition employing the method of the instant invention.

The present invention has met the above-described needs. The present invention provides a method for controlling and removing solid deposits from a surface of at least one component of a steam generating system wherein the solid deposits are porous and are formed from an impurity introduced into the steam generating system which comprises adding to an aqueous phase of the steam generating system an effective amount of at least one volatile amine having a pKa value greater than about 10.61 and selected from the group consisting of an alkyl amine, a cyclo alkyl amine, and derivatives thereof, converting the aqueous phase having the volatile amine to a steam phase having the volatile amine, wherein the steam phase is selected from the group consisting of wet steam, saturated steam and superheated steam, exposing the steam phase having the volatile amine to the surface of the component laden with the solid deposits, wherein each of the solid deposits has at least one functional site selected from the group consisting of (1) an acidic site to which an inorganic cation is sorbed, (2) a basic site to which an inorganic anion is sorbed, and (3) combinations thereof, for effecting selective sorption of the volatile amine by the solid deposit and displacing the inorganic cation, anion or combinations thereof, and providing thermal cycling having a temperature ranging, for at least one cycle, from greater than or equal to 0° C. (Centigrade) to less than or equal to about 550° C. for effecting at least one cycle of sorption and desorption of the volatile amine wherein the rate of the desorption of the volatile amine exceeds the rate of diffusion of the volatile amine from the porous solid deposit for controlling and removing the porous solid deposits from the surface of the component.

In a preferred embodiment of this invention, the method as described herein, is provided wherein the volatile amine is dimethylamine.

In another embodiment of this invention, the method, as described herein, is provided wherein the volatile amine is an amine selected from the group selected consisting of mono-N-butylamine, monomethylamine, monoisopropylamine, tri-N-propylamine, monoethylamine, trimethylamine, triethylamine, diisobutylamine, di-N-propylamine, diethylamine, ethyl-N-butylamine, quinuclidene, tetramethyl-imino-bis-propylamine, pyrrolidine, di-N-butylamine, diisopropylamine, dimethylamino-propylamine, N-ethylcyclohexylamine, and 1,5 diazabicyclo5.4.0undec-5-ene.

Another embodiment of this invention provides a method, as described herein, wherein the component of the steam generating system is selected from at least one of the group consisting of a turbine and a steam generator, and more preferably wherein the turbine and the steam generator are that of a utility power station.

Another embodiment of this invention provides a method for controlling and removing solid deposits from a surface of at least one component of a steam generating system, as described herein, wherein the removal of the solid deposits is carried out on-stream with the steam generating system operational, or optionally the removal of the solid deposits is carried out off-stream with the steam generating system shut down.

In yet a further embodiment of this invention, the method, as described herein, is provided including adding to the aqueous phase of the steam generating at least one amine having a pKa value less than about 10.61.

In a preferred embodiment of this invention, a method is provided as described herein, including recovering substantially all the megawatts of energy lost due to the accumulation of the solid deposits at the surface of the turbine.

In another preferred embodiment of this invention, a method is provided, as described herein, including improving the thermal efficiency of the steam generating system.

DETAILED DESCRIPTION OF THE INVENTION

The instant invention is directed to a method for controlling and removing solid deposits from a surface of at least one component of a steam generating system wherein the solid deposits are porous and are formed from an impurity introduced into the steam generating system.

As used herein, the term "steam generating system" is meant to include any type of system containing an aqueous phase that is capable of being converted to a steam phase, including but not limited to, for example, industrial boiler water systems, process boiler water systems, and boiler water systems of a utility power station such as, for example, nuclear power plants and fossil fuel power plants. A "component" of the steam generating system refers to an element making up the steam generating system as understood by those skilled in the art and is meant to include, such as for example, but not limited to, a steam generator, a turbine, a boiler drum, a heat exchanger, and steam generator tubing.

As used herein, the term "sorption" is meant to include, but is not limited to, physical as well as chemical chemisorption effects and refers to the ability of a substance to hold or concentrate gases, ions, solids including particulates or dissolved substances upon its surface. As used herein, the term "desorption" is meant to include the reverse of sorption and refers to the evolution or liberation of a material from a solution or a substance.

As used herein, the term "controlling solid deposits" is meant to include, such as for example, but not limited to, solid deposit inhibition, threshold precipitation inhibition, stabilization, dispersion, solubilization and/or particle size reduction of solid deposits,; and the substantial prevention of solid deposit formation.

The term "effective amount" refers to that amount of a composition necessary to bring about a desired result such as, for example, the amount of volatile amine necessary for controlling and/or removing solid deposits from a surface of a component of a steam generating system. Generally, for the method of the instant invention, the effective amount will range such as, for example, from about 10 ppb to 50,000 ppb of the volatile amine based on the total weight of the aqueous phase of the steam generating system being treated, preferably from about 0.5 ppm to 50 ppm, and most preferably from about 0.5 to 10 ppm.

As used herein, the term "pKa" is the symbol for the logarithm of the reciprocal of the acid dissociation constant of an electrolyte. The reference temperature for pKa values is about 25° C. It will be understood by those skilled in the art that pKa values decline with increasing temperature, and further, preferred amines will have a pKa at higher temperature equal to or greater than dimethylamine at said temperature. For example, the pKa of dimethylamine at about 250° C. is known to be about 6.50 and at 25° C. is about 10.61.

As used herein, the term "passivation" refers to the formation of a film which lowers the corrosion rate of the metallic surface which is being treated. "Passivation rate" refers to the time required to form a protective film on a metallic surface.

The present invention provides a method for controlling and removing solid deposits from a surface of at least one component of a steam generating system wherein the solid deposits are porous and are formed from an impurity introduced into the steam generating system-which comprises adding to an aqueous phase of the steam generating system an effective amount of at least one volatile amine having a pKa value greater than about 10.61 and selected from the group consisting of an alkyl amine, a cyclo alkyl amine, and derivatives thereof, converting the aqueous phase having the volatile amine to a steam phase having the volatile amine, wherein the steam phase is selected from the group consisting of wet steam, saturated steam and superheated steam, exposing the steam phase having the volatile amine to the surface of the component laden with the solid deposits, wherein each of the solid deposits has at least one functional site selected from the group consisting of (1) an acidic site to which an inorganic cation is sorbed, (2) a basic site to which an inorganic anion is sorbed, and (3) combinations thereof, for effecting selective sorption of the volatile amine by the solid deposit and displacing the inorganic cation, anion or combinations thereof, and providing thermal cycling having a temperature ranging, for at least one cycle, from greater than or equal to about 0° C. to less than or equal to about 550° C. for effecting at least one cycle of sorption and desorption of the volatile amine wherein the rate of the desorption of said volatile amine exceeds the rate of diffusion of the volatile amine from the porous solid deposit for controlling and removing the porous solid deposits from the surface of the component. Preferably, the method, as described herein, includes wherein the cycle of sorption is carried out at a temperature ranging from greater than or equal to about 0° C. to less than or equal to about 100° C., and wherein the cycle of desorption is carried out at a temperature ranging from greater than or equal to about 100° C. to less than or equal to about 550° C. More preferably, the method of the instant invention includes wherein the cycle of desorption is carried out by raising the desorption cycle temperature above the sorption cycle temperature by greater than or equal to an increment of about 100° C. Preferably, the volatile amine used in the instant invention is dimethylamine. Alternate volatile amines having a pKa value greater than about 10.61, which may be used in the instant invention include, such as for example, but not limited to, mono-N-butylamine, monomethylamine, monoisopropylamine, tri-N-propylamine, monoethylamine, trimethylamine, triethylamine, diisobutylamine, 1,8 diaminooctane, 1,6 diaminohexane, 1,5 diaminopentane, trimethyleneimine, di-N-propylamine, diethylamine, ethyl-N-butylamine, quinuclidene, tetramethyl-imino-bis-propylamine, pyrrolidine, di-N-butylamine, diisopropylamine, dimethylamino-propylamine, N-ethylcyclohexylamine, and 1,5 diazabicyclo5.4.0undec-5-ene.

In a preferred embodiment of this invention, the method, as described herein, includes wherein the components of the steam generating system are selected from at least one of the group consisting of a turbine and a steam generator. It will be understood by those skilled in the art that the surfaces of the components of the steam generating system are generally of a metallic character including, such as for example, metallic alloys.

It will be understood by those persons skilled in the art that this invention includes a method for exploiting the electrophoretic properties of solid deposits formed from an impurity introduced into the steam generating system, effecting the selective sorption of at least one high pKa volatile amine and providing thermal cycling for removing the solid deposits. It will be appreciated by those persons skilled in the art that the physical step of thermal cycling of the present invention effects at least one cycle of sorption and desorption of the volatile amine wherein the rate of desorption of the volatile amine exceeds the rate of diffusion of the volatile amine from the porous solid, thus creating internal pressure, stress, and finally the spalling of the solid deposit. For example, it is believed that the sorption of high pKa amines displaces inorganic cations such as, for example, $Na^+$ and $K^+$, which are present at acidic centres on the solid deposit. This provides a cleanup method to lower the corrosive impurity background near the metal surface of the component of the steam generating system and within the steam cycle.

Removal of the solid deposit, from deposited impurities, eliminates sites for hideout of corrosive salts, both acidic and alkaline. It is important to note that the method of this invention for removing the solid deposits does not require dissolution of the solid deposits, and therefore, the instant method of removal includes the solid form and sorbed salts.

The instant method of solid deposit removal enhances the cleanup by demineralization, filtration and blowdown systems of the steam generating system. It will be appreciated that the instant method of removal of sorbed inorganic salts minimizes their effect on the solution chemistry and corrosion mechanisms, during the cleanup process. Further, the method of this invention can be practiced on-stream with the steam generating system operational or off-stream with the steam generating system shut down. It will be appreciated that the method, as described herein, includes employing the steam generating system in the shut down mode wherein the volatile amine is exposed to the surface of the component laden with the solid deposits in an aqueous phase, in a steam phase, or combination thereof.

The applicants have found that employing the method of the present invention resulted in achieving a lower sodium concentration which is in direct contrast to the results achieved when the concentration of conventional alkalizing amines such as, for example, ammonia, morpholine, hydrazine, or ethanolamine are raised in a steam generating system.

When solids accumulate on the turbine or components comprising the steam generating system of a power plant, the heat transfer efficiency of the plant is decreased. This decrease in heat transfer efficiency translates into a lowering of the amount of megawatts which the system can produce. Elimination of the accumulated solids returns the heat transfer efficiency, and therefore the megawatts of the plant, to the level it operated at prior to the accumulation of the solids. In a most preferred embodiment of this invention, the method, as described herein, provides for recovering substantially all megawatts of energy lost due to the solid deposits accumulating on the turbine of the steam generating system of a utility power station. In another preferred embodiment of the present invention, the method, as described herein, includes improving the thermal efficiency of the steam generating system. More specifically, the present method improves steam cycle thermal performance through control of deposited solids, from introduced impurities, which inhibit heat transfer and/or distort critical design geometries of the steam turbine component, thereby impacting steam utilization efficiency.

Another embodiment of the present invention provides a method as described herein, including adding to the aqueous phase of the steam generating system an effective amount of at least one amine having a pKa value less than 10.61 and an effective amount of at least one volatile amine having a pKa value greater than about 10.61.

It will be understood by those skilled in the art that the volatile amines employed in the method of the present invention, as described herein, are water soluble or water dispersible.

EXAMPLES

The following examples demonstrate the invention in greater detail. These examples are not intended to limit the scope of the invention in any way.

Examples 1 and 2

Dimethylamine was introduced to the nuclear steam cycle, Example 1, and fossil steam cycle, Example 2, as a dilute aqueous solution, as set forth herein. DMA was fed to the aqueous phase of the system for Example 1. For Example 2, the main boiler bulk water was treated with dimethylamine to maintain the pH between about 9.6 and 9.8. The concentration of dimethylamine was varied, as set forth herein, to evaluate the efficacy for removal of deposited solids, resulting from introduced impurities.

Unconventional sampling and analysis methods were employed to elucidate the form of materials removed. These methods included collection of transported solids on submicron filters, arranged in series, and having effective ratings of about 0.45 microns to 0.015 microns. These filters were subjected to surface examination techniques including scanning electron microscopy (SEM), Electron Dispersive Spectroscopy (EDS) and elemental analysis by inductively coupled plasma (ICP) on acid dissolved samples.

Additional sampling included collection of transported solids through particulate filters, followed by cation exchange resins columns, and finally through anion exchange resin columns. Since the electrophoretic properties of the transported solids have positive and negative charges, passing the solids through both cationic and anionic exchange resins allowed for differentiation of these solids based upon their acidic and basic functionalities.

Additional sampling included scraping of deposits from the steam turbine for Example 2, for the purpose of characterization. These results were directly compared to the composition of transported solids collected during the removal process. The steam turbine was visually inspected before and after deposit removal to further verify the method.

Baseline samples, prior to dimethylamine addition, were conducted for Examples 1 and 2 to provide a benchmark for comparison. These results were taken in the presence of conventional amines not known to have efficacy for removal of deposited solids from introduced impurities. More specifically, these treatments included employing the conventional amines morpholine, hydrazine and ammonia for Example 1 and hydrazine, ammonia and phosphate for Example 2.

Example 1

Three separate phases of the nuclear plant demonstration included baseline studies, raising treatment levels to confirm the method and extended testing to optimize the treatment concentrations in a mixed amine system.

Comparison of ion exchange data indicating the amount of aluminum transport for the feedwater (i.e. aqueous phase) and steam generator blowdown, set forth in Table 1, reveals the reduction of aluminum below detection limits, after dimethylamine treatment. This data, from the ion exchange method, demonstrates the bifunctional properties of the solid having acidic functionality.

Steam generator blowdown data, set forth in Table 2, during initial application of dimethylamine reveals the abundance of various elements, exhibiting bifunctional properties. The cationic fraction being soluble and the anionic fraction being colloidal/particulate solids having acidic functionality.

The EDS spectra from solids, as set forth in FIG. 1, collected during initial dimethylamine treatment revealed the composition of the deposited solid and the sorbed salt species. This data reflected that any sorbed monovalent species were cations such as, for example, sodium and potassium, and indicated that the alumina silicates were formed under alkaline conditions.

Figure 2:
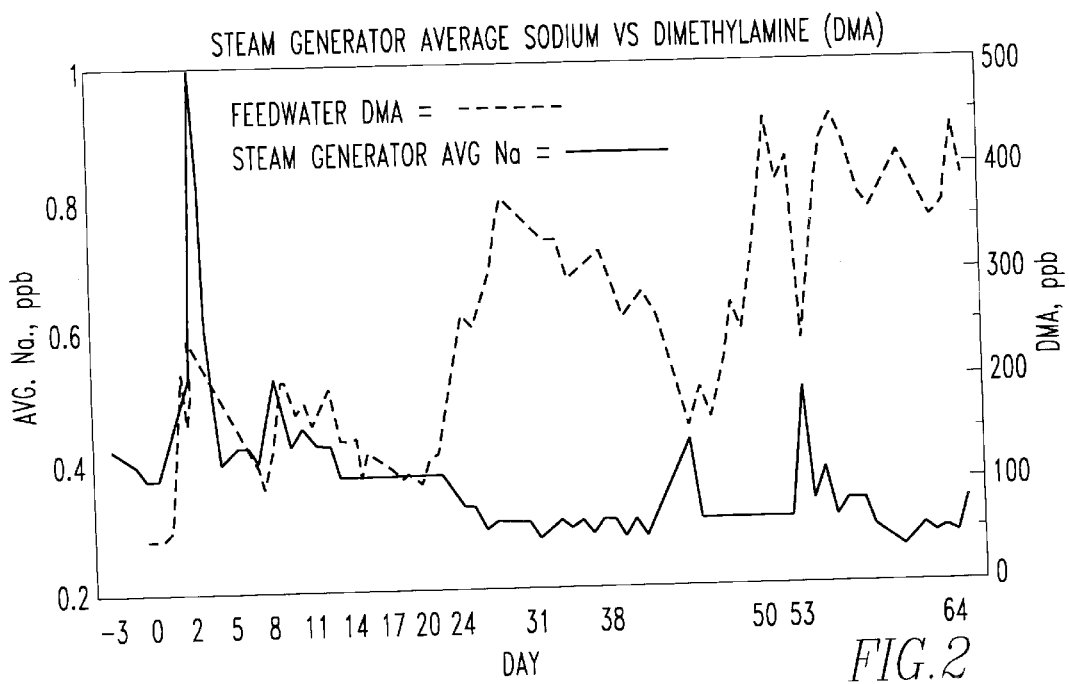
FIG. 2 compares the steam generator average sodium concentration in relation to initial dimethylamine addition employing the method of the instant invention.
Figure 3:
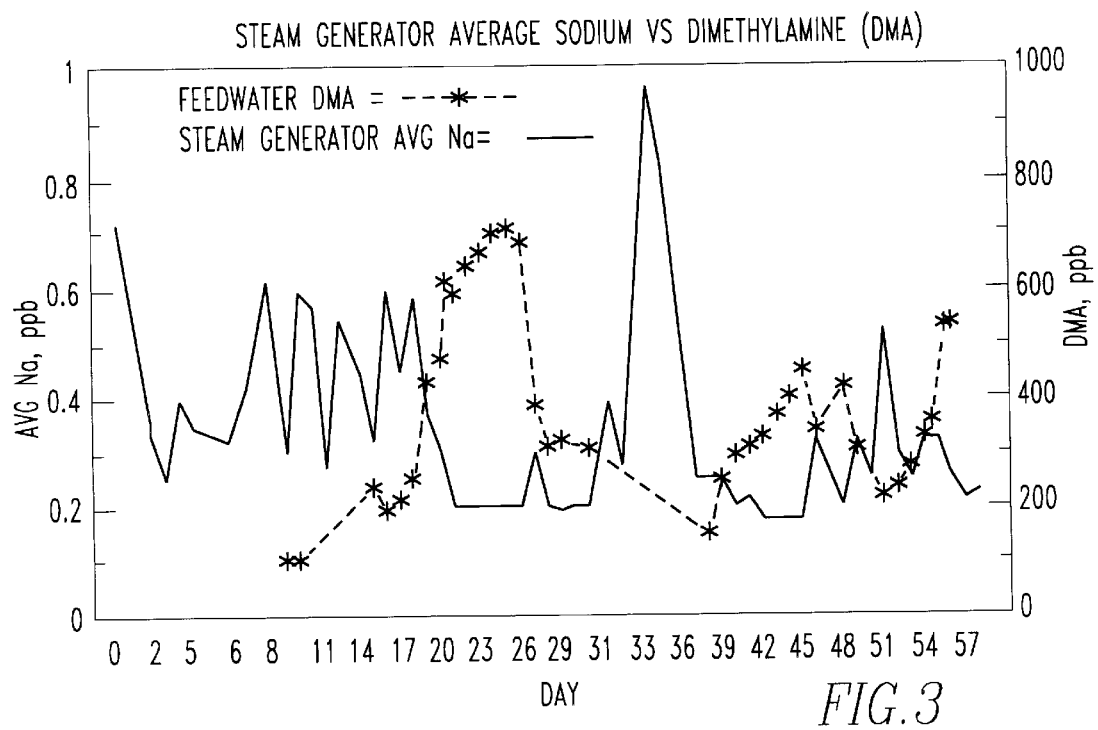
FIG. 3 compares the steam generator average sodium concentration in relation to second phase testing of dimethylamine addition employing the method of the instant invention.

The elution of monovalent sodium, as set forth in FIG. 2, created a spike in concentration during initial treatments. It is important to note that FIG. 2 shows that employing the method of this invention resulted in the reduction in sodium to unprecedented levels not achieved by the background art. This was demonstrated further as dimethylamine was raised to a higher concentration during the second phase of testing, as set forth in FIG. 3. Condensate polisher run time was extended from thirty to sixty days during the demonstration of dimethylamine. In contrast, raising the concentration of conventional amines, such as ammonia, is known to increase sodium leakage from condensate polishers and to shorten the run time. Therefore, it will be appreciated by those persons skilled in the art that this invention represents a major technological breakthrough in steam cycle chemical treatments, having large economic benefits.

Figure 4:
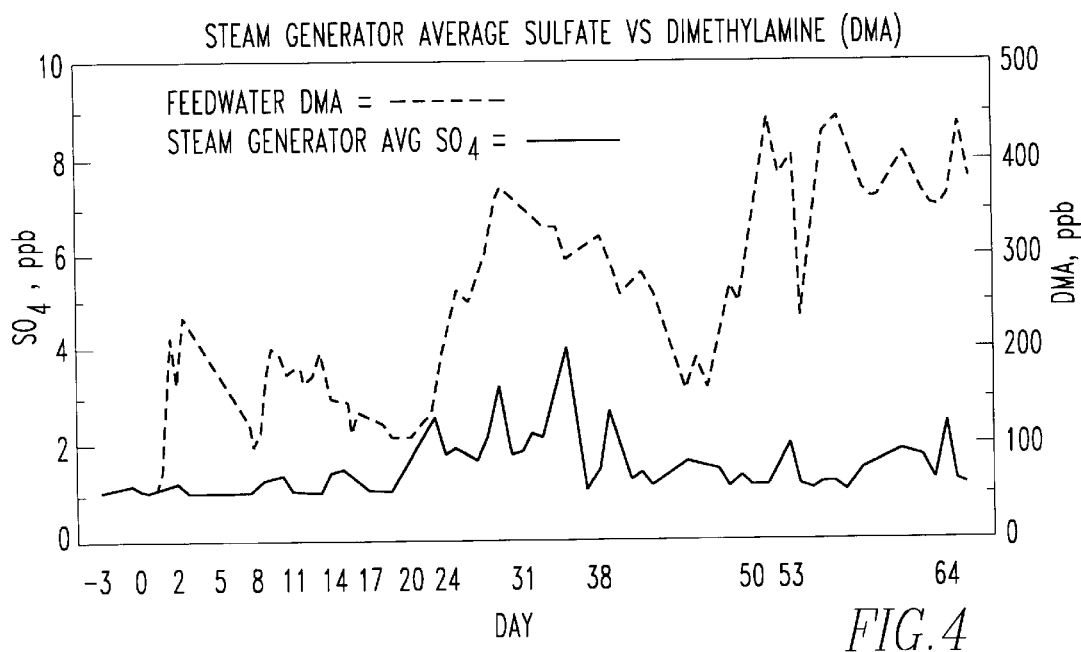
FIG. 4 compares the steam generator average sulfate concentration in relation to initial dimethylamine addition employing the method of the instant invention.
Figure 5:
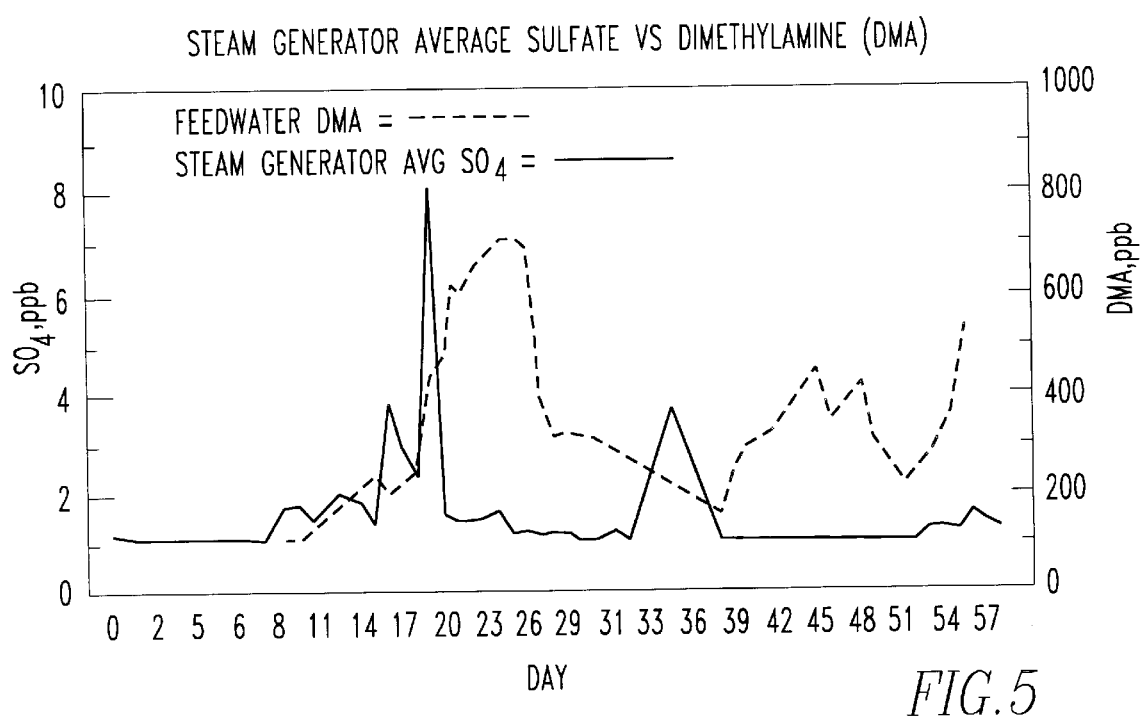
FIG. 5 compares the steam generator average sulfate concentration in relation to second phase testing of dimethylamine addition employing the method of the instant invention.
Figure 7:
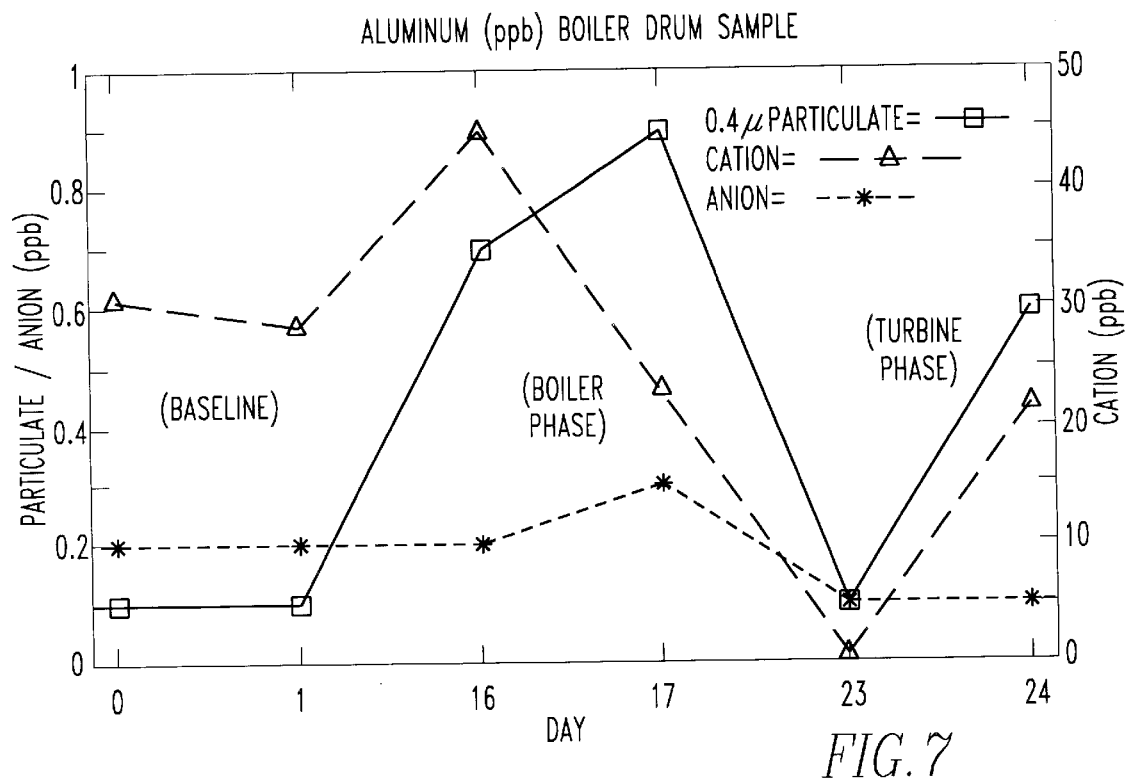
FIGS. 7 through 11 show the particulate, anion and cation fractions of aluminum, silica, calcium, potassium, and sodium, respectively, removed from a boiler drum sample for baseline conditions and upon employing the method of the instant invention.

The data for reduction of anions, as set forth in FIG. 4, particularly sulfate, reflected intervention of dimethylamine with retrograde salts such as calcium sulfate and magnesium sulfate, which deposit in steam cycles at high temperatures. The collection of the solid phase, as set forth in Table 2, of both calcium and magnesium before addition of dimethylamine indicated that calcium and magnesium were below detection limits (i.e. not detectable), and that after the initial addition of dimethylamine, both cationic and anionic functionality was present. Both the metal sulfate and sulfide solids are known in the art to exhibit acidic functionalities. Data for the second phase of the demonstration, as set forth in FIG. 5, revealed further efficacy as dimethylamine was raised to higher concentrations.

It will be appreciated that the results for Example 1, a 1150 megawatt pressurized water reactor nuclear plant, clearly reveal that the method of the present invention is a breakthrough in technology and that deposition of solids from introduced impurities can be effectively controlled by the method of this invention. It will be appreciated that corrosion protection of critical plant systems is enhanced by reducing the background concentration of corrosive salts as well as their presence when sorbed into solid acids and bases. Further, applicants found that employing the method of the present invention raised the steam cycle thermal performance and increased the output of the high pressure steam turbine by about 0.4%.

Example 2

Three separate phases of the fossil plant demonstration include baseline data collection prior to dimethylamine treatment, on-stream boiler treatment to reduce background levels of solids from introduced impurities, and high pressure turbine cleanup including thermal cycling. It will be appreciated that thermal cycling includes plant cooldown and heatup to enhance the rate of cleanup.

Baseline data from turbine blade scrapings are shown in FIG. 6. Samples 1 & 2 are from separate areas of the turbine blade but reflect similar compositions by EDS analyses. These samples were then combined for XRD analyses, as set forth in Table 3. Sample 3 was a filtered, high volume, steam drum location sample.

Comparison of Samples 1 & 2 vs. Sample 3 reflect predictable differences in composition according to the relative volatility and solubility of the elements. Also, the turbine samples, 1 & 2, reflect greater basicity of the solid, although it was clearly bifunctional. The XRD analyses, Table 3, reveals a sample comprised primarily, of introduced impurities and high in alumina and silica. Compound identification included about 45–56 percent sodium aluminum silicate ($Na_2O.Al_2O_3.2.1\ SiO_2$) and about 20–30 percent aluminum oxide hydroxide chloride ($Al_{17}O_{16}(OH)_{16}Cl_{13}$).

Additional baseline studies include high volume integrated samples, on-stream, for the boiler drum, economizer inlet and superheat locations. These and similar post injection samples were analyzed by ICP. Comparison of results for the three distinct phases revealed steam transport for baseline, boiler cleanup and turbine cleanup.

Five introduced impurities (Al, $SiO_2$, Ca, K, Na) are trended, FIGS. 7–11, for the boiler drum sample. It should be noted that boiler drum blowdown was the primary means to extract impurities during all three phases. It will be appreciated that the collection of particulate, cation and anion fractions revealed the composition and electrophoretic properties of solids removed from the boiler vs. the turbine.

Figure 8:
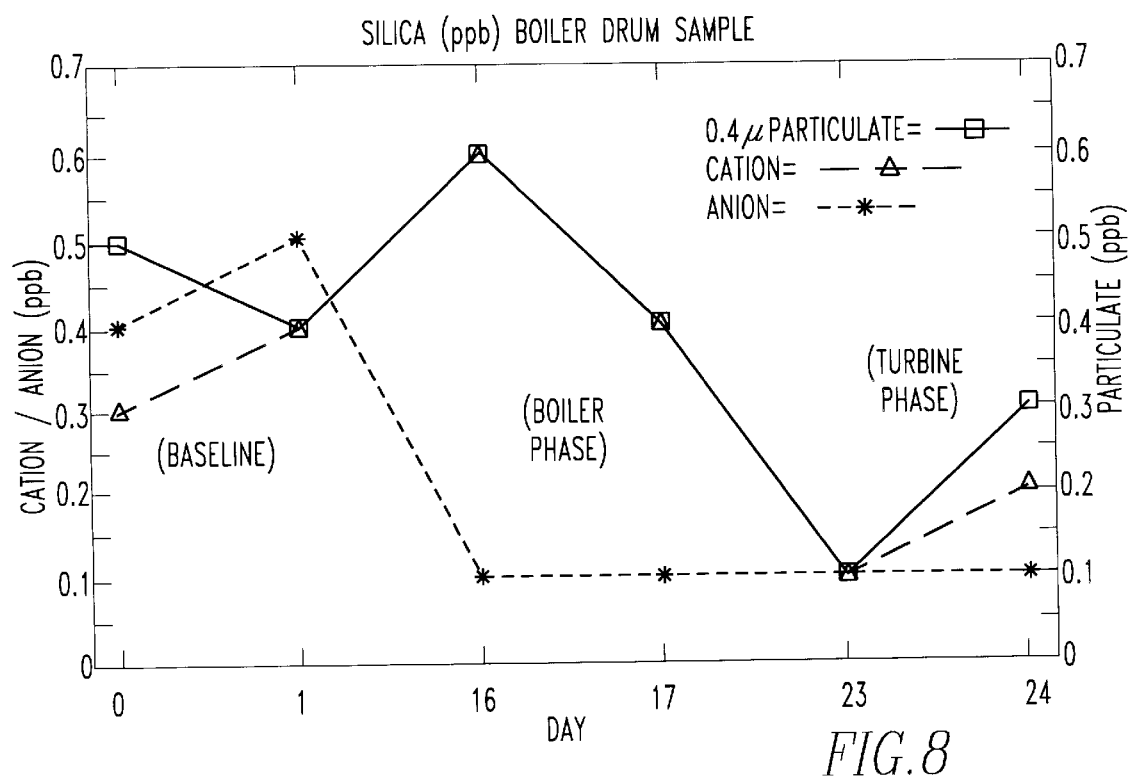
Figure 9:
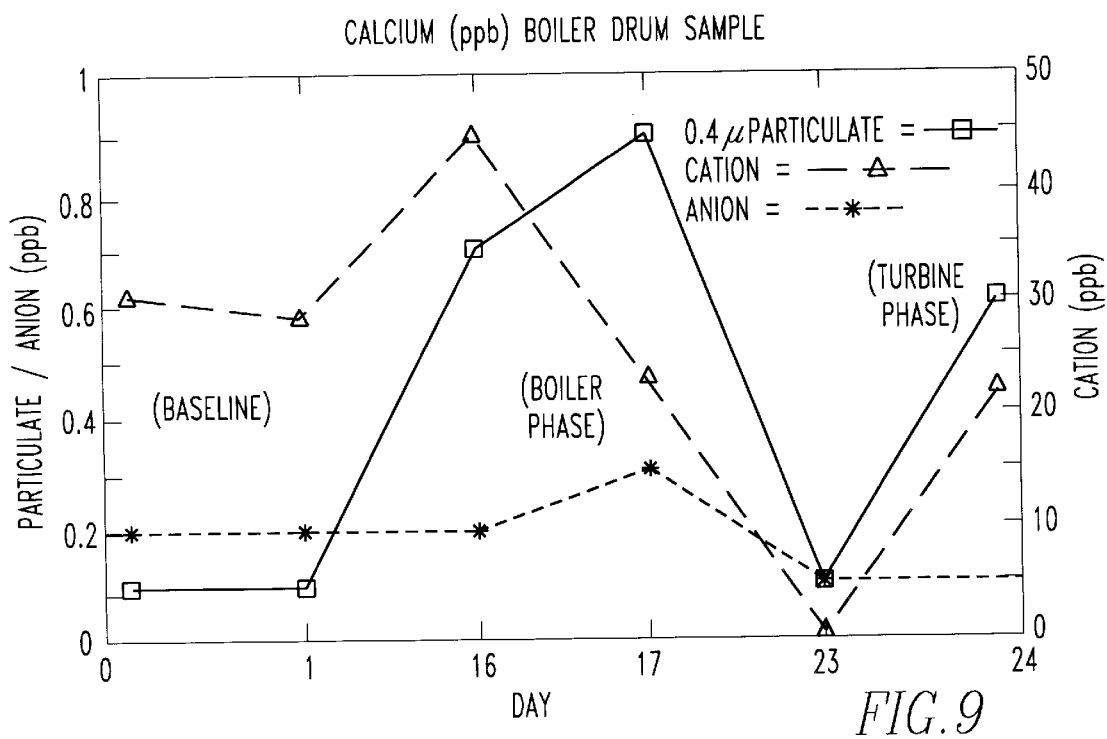
Figure 10:
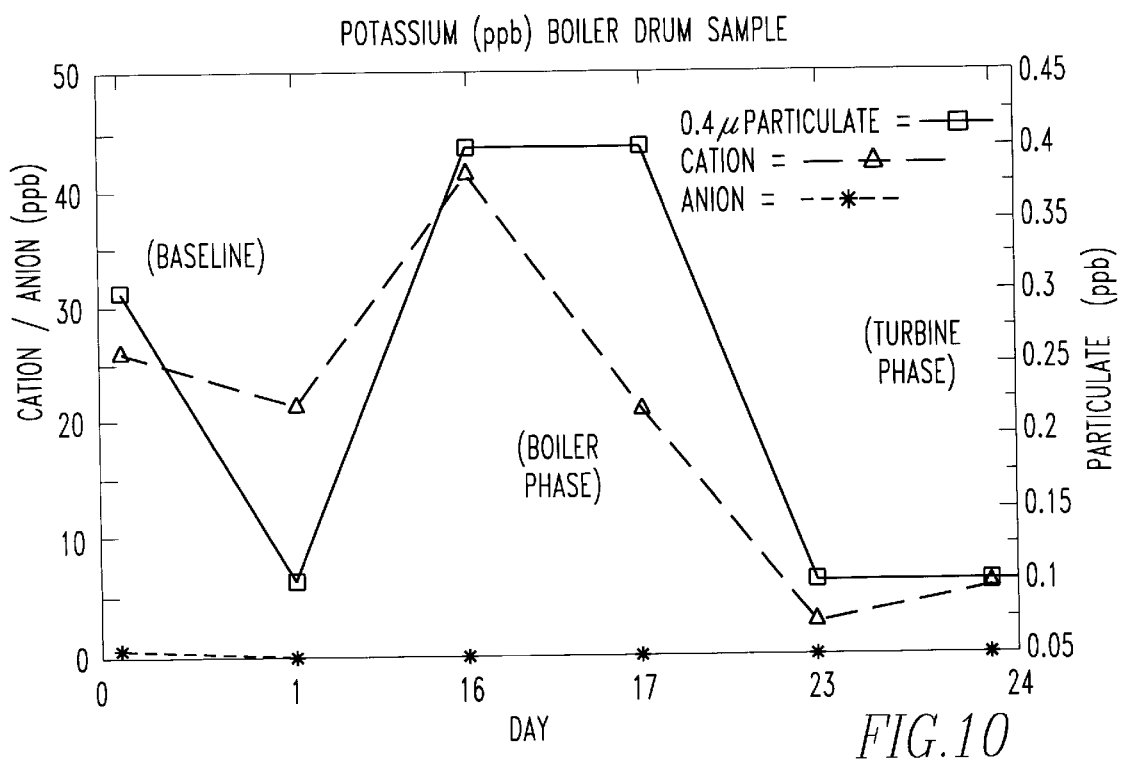
Figure 11:
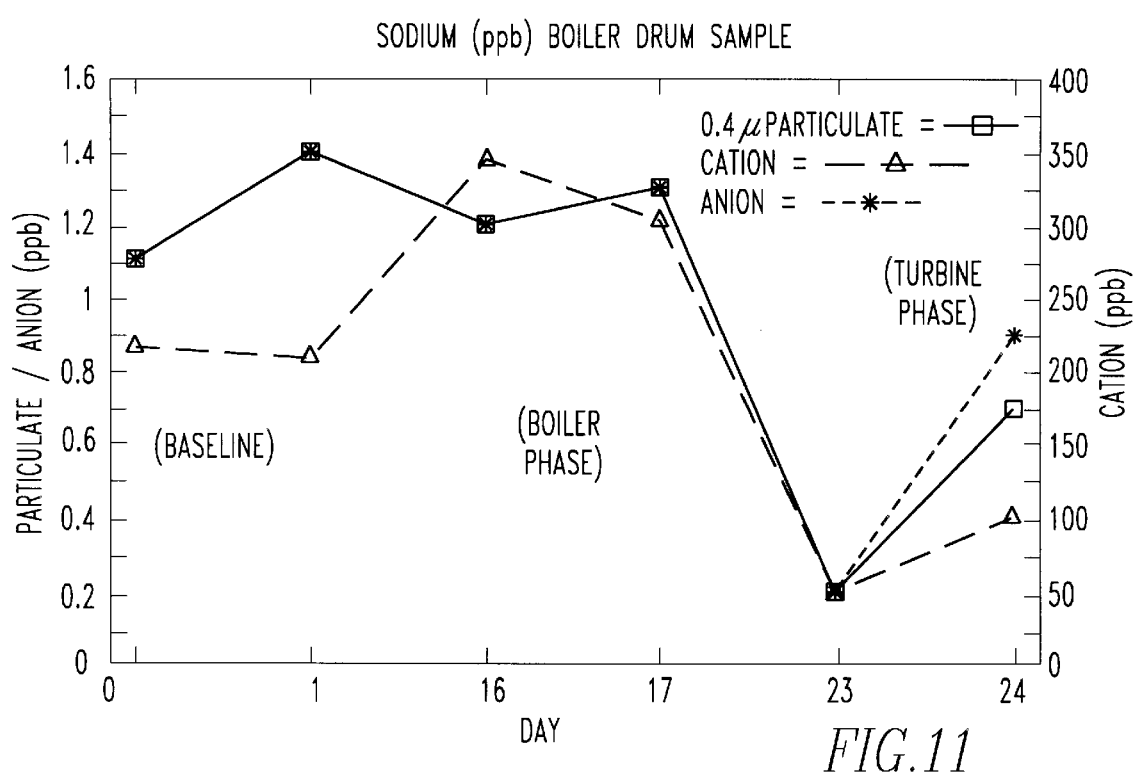

FIG. 8 shows that employing the method of this invention resulted in a prompt reduction of electronegative silica and that much of the solid formed silica was removed equally as a cation and particulate. Soluble calcium was dramatically reduced and removal was by particulate and cation, as set forth in FIG. 9. The presence and removal of sodium as an anion was comparable during the first two phases but exceeded other forms during the turbine phase, as set forth in FIG. 11. Both sodium and potassium, see FIG. 10, were eluted by dimethylamine such that the soluble fraction was increased.

Figure 12A:
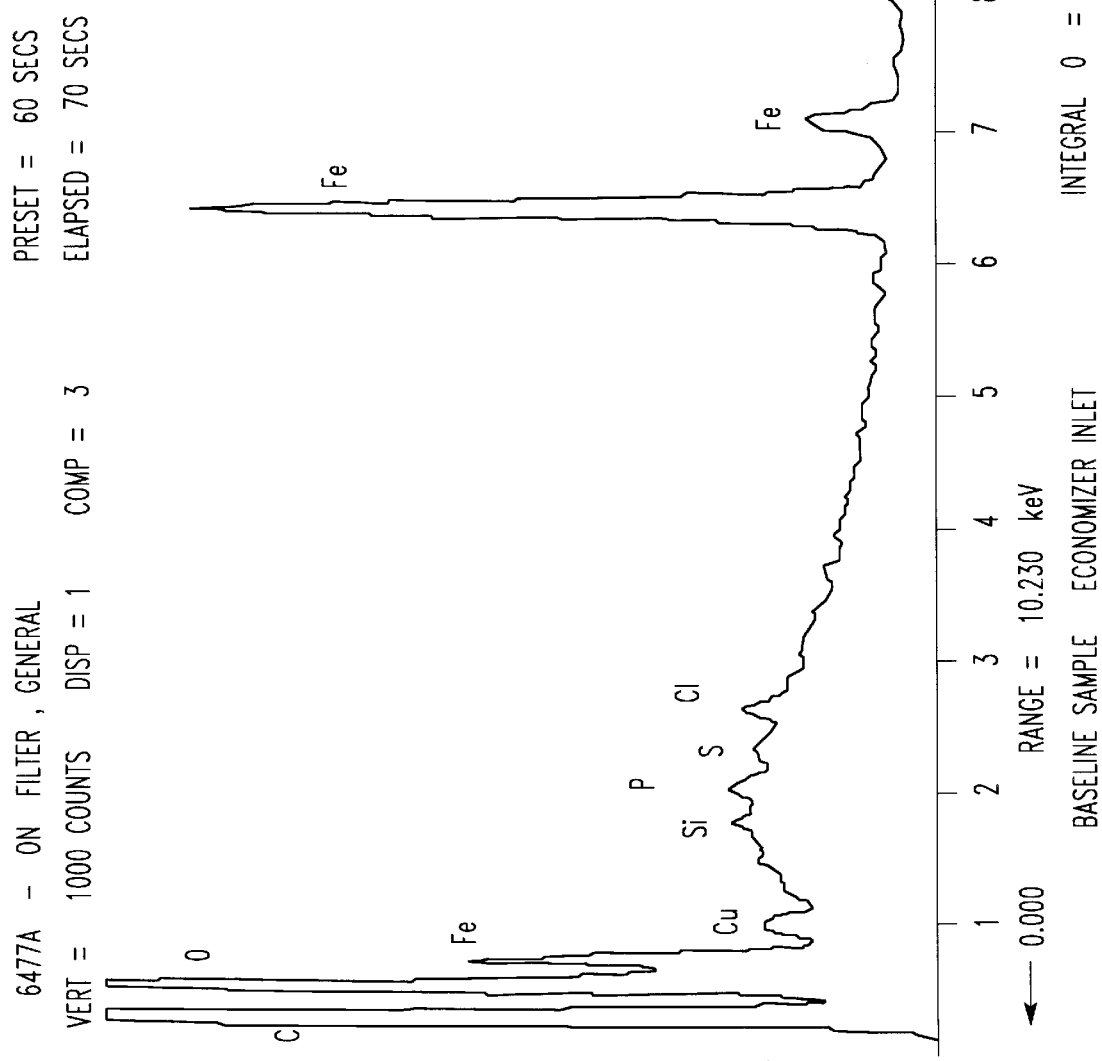
FIG. 12A shows the Electron Dispersive Spectroscopy spectra for establishing a baseline for economizer inlet samples.
Figure 12B:
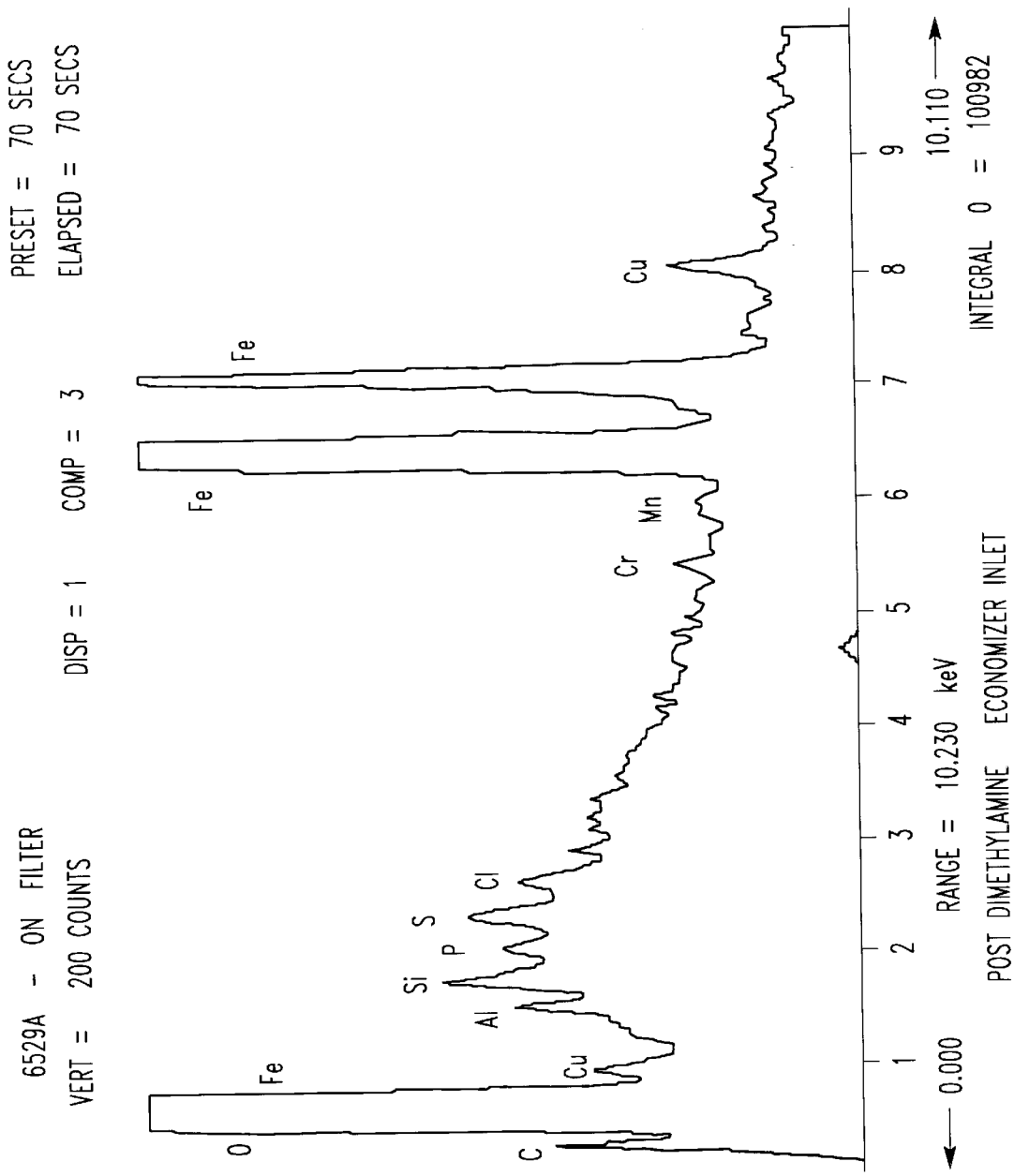
FIGS. 12B and C show the Electron Dispersive Spectroscopy spectra for samples at the economizer inlet for cleanup cycles employing the method of the instant invention.
Figure 12C:
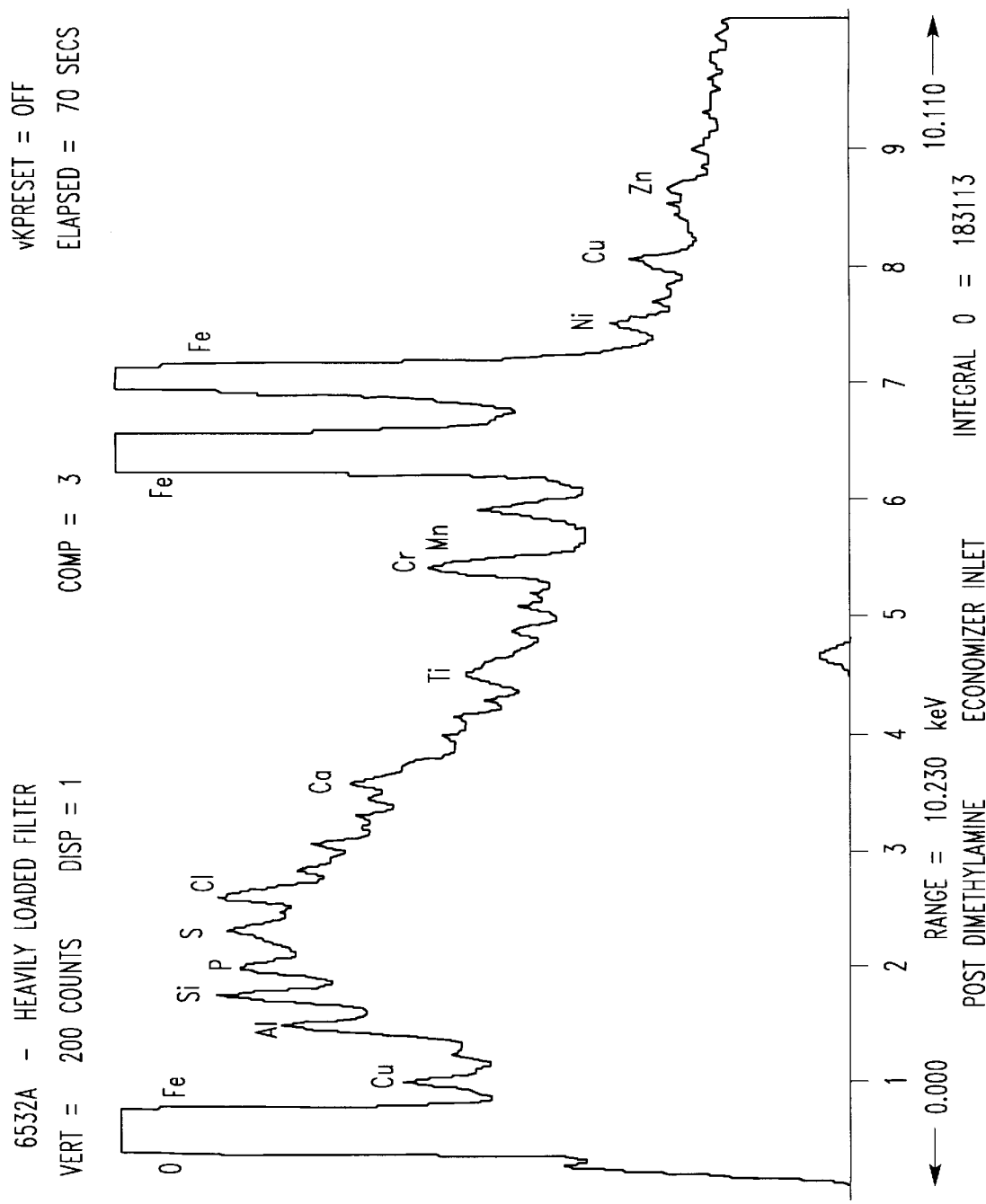
FIG. 12D shows the Electron Dispersive Spectroscopy spectra for a sample at the boiler drum for cleanup of cycles employing the method of the instant invention.
Figure 12D:
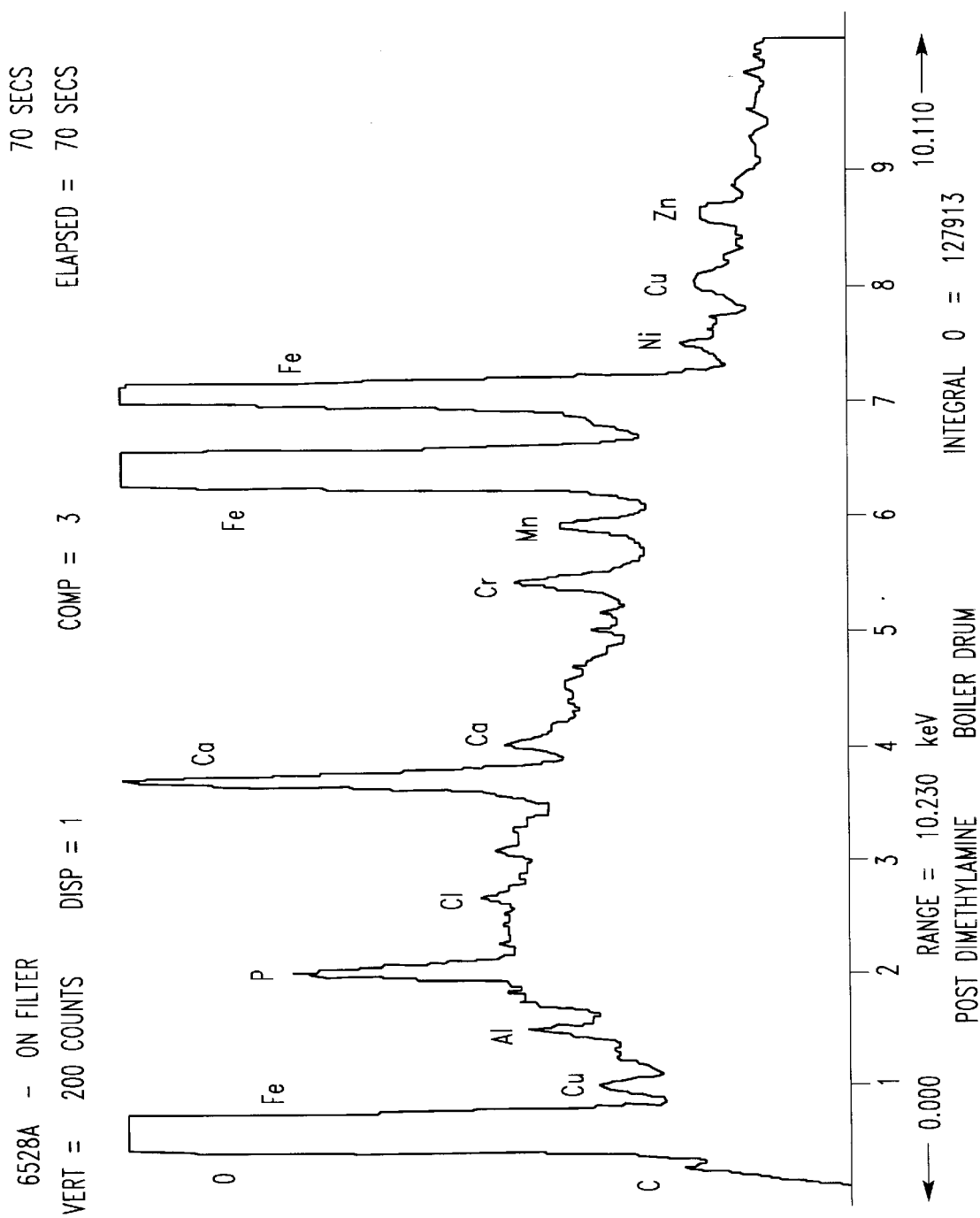

Additional samples, during all phases, were analyzed by SEM and EDS to further reveal the composition of the solid deposits removed by the instant invention employing dimethylamine. The economizer inlet samples are presented for baseline, FIG. 12A, and for two turbine cleanup cycles, FIGS. 12B & 12C. The baseline sample did not reveal many of the elements as post treatment samples. Also, the post treatment boiler drum sample, FIG. 12D, contained an abundance of prismatic crystals of calcium phosphate.

It will be understood from this data that the removal of solids from introduced impurities employing the method of this invention was quite dramatic, thus reflecting the selectivity of these solids for volatile amines having a pKa value greater than about 10.61, and more specifically, dimethylamine. The boiler cleanup phase increased steam transport of solids and short term deposition at the high pressure turbine. The turbine cleanup phase resulted in a major improvement in unit output as shown in FIG. 13 of about 12 megawatts, while steam flow was reduced, 8000 pounds per hour, below baseline conditions.

It will be appreciated that the method of this invention for controlling and removing steam cycle solid deposits from introduced impurities has many benefits and advantages over conventional amine treatments. The benefits include avoidance of conventional chemical cleaning, recovery of unit output, improved heat rate, avoidance of turbine outages, and enhanced corrosion protection of the steam turbine. Further advantages of the treatment include a low cost of application of the method of this invention without impact on plant availability.

The data for Examples 1 & 2 reflect the benefits and advantages of employing the method of this invention in both medium pressure (1000 psi) and higher pressure (2500 psi) steam cycles. The lower pressure system, Example 1, is a 1150 megawatt pressurized water reactor power plant, operated at or near saturated steam condition. The higher pressure system, Example 2, is a 400 megawatt, drum boiler design, fossil power plant, operated with superheat.

The preferred embodiment of the method of this invention employs dimethylamine as the volatile amine added to the aqueous phase of the steam generating system. It will be appreciated by those skilled in the art that the efficacy and rate of deposit removal are affected by volatility of the amine. Also, the application conditions vary from single phase liquids, wet steam, saturated steam and superheated steam. For steam turbines, it was found that the distribution of volatile amines to the metal surface decreases as steam quality increases (wet steam >>> saturated steam >>> superheated steam).

It will be further appreciated that conventional methods of cleaning such as, for example, but not limited to, chemical cleaning such as, for example, foam cleaning, or mechanical cleaning such as, for example, water lancing or pressure pulse cleaning, can be augmented by employing the method of the instant invention.

It was found while employing the method of this invention relative to the thermal cycling step that the startup/shutdown modes of the utility power plant were optimum times for dimethylamine addition since lower steam qualities increased surface activity of the volatile amine. The addition of the volatile amine to the steam generating system may be at, for example, the main boiler, auxiliary boiler or temporary boiler steam supplies. For example, effective cleanup of a high pressure (2500 psi) turbine was demonstrated during normal startup evolutions. The main boiler bulk water was treated with dimethylamine to maintain the pH (at 25° C.) between about 9.6 and 9.8. Results included recovery of about 12 megawatts electrical output and reduction of steam flow (8,000 pounds per hour) to improve unit heat rate.

It was found that employing the method of this invention at normal power operation that the rate of cleanup or efficacy was better for saturated steam conditions and low pressure turbines. Therefore, cleanup of nuclear plant turbines was best accomplished at full power conditions. It was found that employing the method of this invention over a longer period of time was required for superheat steam conditions, such as high pressure fossil plants.

Further it was found while employing the method of this invention as to boilers or steam generators that the distribution of volatile amines to metal surfaces or crevices is reduced under steaming conditions. However, the distribution of the volatile amine was satisfactory to effect cleanup of both a high pressure boiler and low pressure steam generator while at 100% power conditions. It will be appreciated that the method of the present invention for deposit removal may be employed off-line, such as for example, as a soak or effecting a wet layup, as known to those skilled in the art, using higher concentrations of volatile amines to enhance the rate of cleanup and coupled with thermal cycling. More specifically, this embodiment of the present invention includes raising the water level above the boiler/steam generator tubes and preferably above the steam separators, adding dimethylamine to maintain about 0.5 to 10.0 ppm while maintaining temperature between about 37° C. to 316° C., maintaining blowdown flow to remove solids and to promote circulation and mixing, and employing thermal cycling. It was noted that a partial heatup, such as, for example, about greater or equal to 100° C., was effective without reaching full operating temperatures.

Table 4 sets forth, for example purposes only, a partial list of volatile amines having a pKa value at 25° C. greater than about 10.61 that may be employed in the method of the instant invention. It will be understood that the examples of volatile amines set forth in Table 4 should not, however, be viewed as limiting the present invention in any way.

Whereas particular embodiments of the instant invention have been described for the purposes of illustration, it will be evident to those skilled in the art that numerous variations and details of the instant invention may be made without departing from the instant invention as defined in the appended claims.

TABLE 1

EXAMPLE 1

ALUMINUM TRANSPORT
ION EXCHANGE METHOD

| | Anion Concentration (parts per billion) | Cation Concentration (parts per billion) | Total Concentration (parts per billion) |
|---|---|---|---|
| FEEDWATER | | | |
| Baseline | 1.39 | 0.69 | 2.08 |
| Day 22 | 1.0 | 0.49 | 1.49 (after DMA) |
| Day 46 | ND | ND | ND |
| STEAM GENERATOR BLOWDOWN | | | |
| Baseline | 1.62 | 1.16 | 2.78 |
| Day 22 | 1.44 | 0.92 | 2.36 (after DMA) |
| Day 46 | ND | ND | ND |

ND = Not Detectable
DMA = Dimethylamine

TABLE 2

EXAMPLE 1

ION EXCHANGE METHOD-STEAM GENERATOR BLOWDOWN

| | Ca | Mg | Na | K | Al |
|---|---|---|---|---|---|
| BASELINE DATA - BEFORE ADDITION OF DIMETHYLAMINE | | | | | |
| Cation | ND | ND | 3.4 | ND | 1.16 |
| Anion | ND | ND | 0.4 | ND | 1.62 |
| Total | ND | ND | 3.8 | ND | 2.78 |
| INITIAL ADDITION OF DIMETHYLAMINE | | | | | |
| Cation | 3.3 | 7.8 | 1.0 | 1.5 | 9.2 |
| Anion | 7.0 | 5.3 | 0.2 | — | 5.7 |
| Total | 10.3 | 13.1 | 1.2 | 1.5 | 14.9 |

ND = Not Detectable

TABLE 3

EXAMPLE 2

TURBINE DEPOSIT ANALYSIS
XRD METHOD WEIGHT %

| Test | 1 & 2 Above |
|---|---|
| Cl | 0.020 |
| F | 0.099 |
| $SO_4$ | 0.023 |
| $PO_4$ | 1.96 |
| $SiO_2$ | 14.44 |
| Na | 3.49 |
| Al | 16.39 |
| K | 0.24 |
| Ca | <0.001 |
| Fe | 2.90 |
| Cu | 3.11 |
| Ni | 0.05 |
| Mn | 0.02 |
| Mg | 0.0001 |
| Pb | 0.03 |
| En | 0.04 |
| Co | 0.007 |

XRD = X-Ray Diffraction

TABLE 4

| Amines | | pKa |
|---|---|---|
| DMA | Dimethylamine | 10.61 |
| MNBA | Mono-N-Butylamine | 10.61 |
| MMA | Monomethylamine | 10.62 |
| MIPA | Monoisopropylamine | 10.63 |
| TNPA | Tri-N-Propylamine | 10.65 |
| MEA | Monoethylamine | 10.67 |
| TMA | Trimethylamine | 10.71 |
| TEA | Triethylamine | 10.74 |
| DIBA | Diisobutylamine | 10.82 |
| DNPA | Di-N-Propylamine | 10.90 |
| DAP | 1,5 Diaminopentane | 10.915 |
| HDA | 1,6 Diaminohexane | 10.93 |
| DAO | 1,8 Diaminooctane | 10.937 |
| DEA | Diethylamine | 10.98 |
| EBA | Ethyl-N-Butylamine | 11.00 |
| QUI | Quinuclidene | 11.11 |
| TMBPA | Tetramethyl-imino-bis-propylamine | 11.20 |
| PYR | Pyrrolidine | 11.27 |
| TME | Trimethyleneimine | 11.29 |
| DNBA | Di-N-Butylamine | 11.31 |
| DIPA | Diisopropylamine | 11.50 |
| DMAPA | Dimethylamino-propylamine | 11.70 |
| NECHA | N-Ethylcyclohexylamine | 12.00 |
| DBU | 1,5-Diazabicyclo (5,4,0) Unde-5-ane | 13.40 |

(pKa as defined at 25° C.)

What is claimed is:

1. A method for controlling and removing solid deposits from a surface of at least one component of a steam generating system laden with said solid deposits wherein said solid deposits are porous and are formed from an impurity introduced into said steam generating system and wherein said steam generating system produces megawatts of energy, said method comprises:

adding to an aqueous phase of said steam generating system an effective amount of one or more volatile amines having a pKa value greater than about 10.61 at 25° C. and selected from the group consisting of an alkyl amine, a cyclo alkyl amine, and derivatives thereof, to form an aqueous phase having said one or more volatile amines, said effective amount being the amount of said one or more volatile amines necessary for controlling and removing said solid deposits from said surface of at least one component of said steam generating system, said removing of solid deposits does not require dissolution of said solid deposits;

converting said aqueous phase having said one or more volatile amines to a steam phase having said one or more volatile amines, wherein said steam phase is selected from the group consisting of wet steam, saturated steam and superheated steam;

exposing said steam phase having said one or more volatile amines to said surface of said component laden with said solid deposits, wherein each of said solid deposits has at least one functional site selected from the group consisting of (1) an acidic site to which an inorganic cation is sorbed, (2) a basic site to which an inorganic anion is sorbed, and (3) combinations thereof, for effecting selective sorption of said one or more volatile amines by said solid deposits and displacing said inorganic cation, anion or combinations thereof; and providing thermal cycling having a temperature ranging, for at least one cycle, from greater than or equal to about 0° C. to less than or equal to about 550° C. for effecting at least one cycle of sorption and one cycle of desorption of said one or more volatile amines wherein the rate of said desorption of said one or more volatile amines exceeds the rate of diffusion of said one or more volatile amines from said porous solid deposit for controlling and removing said porous solid deposits from said surface of said component.

2. The method of claim 1 including wherein said one or more volatile amines are selected from a group consisting of dimethylamine, mono-N-butylamine, monomethylamine, monoisopropylamine, tri-N-propylamine, monoethylamine, trimethylamine, triethylamine, diisobutylamine, 1,8 diaminooctane, 1,6 diaminohexane, 1,5 diaminopentane, trimethyleneimine, di-N-propylamine, diethylamine, ethyl-N-butylamine, piperidine, quinuclidene, tetramethyl-imino-bis-propylamine, pyrrolidine, di-N-butylamine, diisopropylamine, dimethyl-amino-propylamine, N-ethylcyclohexylamine, and 1,5 diazabicyclo5.4.0undec-5-ene.

3. The method of claim 1 including wherein said one or more volatile amines are dimethylamine and pyrrolidine.

4. The method of claim 1 including wherein said component of said steam generating system is selected from at least one of the group consisting of a turbine and a steam generator.

5. The method of claim 4 including wherein said removing of said solid deposits is carried out on-stream with said steam generating system operational.

6. The method of claim 4 including wherein said removing of said solid deposits is carried out off-stream with said steam generating system shut down.

7. The method of claim 4 wherein said controlling and removing results in the steam generating system increasing its generation of megawatts of energy to a level greater than said steam generating system was generating because of said solid deposits accumulating on said component of said steam generating system.

8. The method of claim 4 whereby said steam generating system has improved thermal efficiency after removal of said solid deposits from said component.

9. The method of claim 1 including adding to said aqueous phase of said steam generating system at least one amine having a pKa value less than about 10.61.

10. The method of claim 1 wherein said steam generating system has a sodium concentration, and said sodium concentration is decreased subsequent to said addition of said one or more volatile amines.

11. The method of claim 1 including carrying out said cycle of sorption at a temperature ranging from greater than or equal to 0° C. to less than or equal to about 100° C., and carrying out said cycle of desorption at a temperature ranging from greater than or equal to about 100° C. to less than or equal to about 550° C.

12. The method of claim 1 including carrying out a cycle of desorption by raising a cycle of desorption temperature above said cycle of sorption temperature by greater than or equal to an increment of about 100° C.

13. The method of claim 1 wherein said steam generating system results in enhanced corrosion protection.

14. A method for controlling and removing solid deposits from a surface of at least one component of a steam generating system laden with said solid deposits wherein said solid deposits are porous and are formed from an impurity introduced into said steam generating system and wherein said steam generating system produces megawatts of energy, said method comprises:

adding to an aqueous phase of said steam generating system an effective amount of a mixture of volatile amines having a pKa value greater than about 10.61 at 25° C. and selected from the group consisting of an alkyl amine, a cyclo alkyl amine, and derivatives thereof, to form an aqueous phase having said mixture of volatile amines, said effective amount being the amount of said mixture of volatile amines necessary for controlling and removing said solid deposits from said surface of at least one component of said steam generating system, said removing of solid deposits does not require dissolution of said solid deposits;

converting said aqueous phase having said mixture of volatile amines to a steam phase having said mixture of volatile amines, wherein said steam phase is selected from the group consisting of wet steam, saturated steam and superheated steam;

exposing said steam phase having said mixture of volatile amines to said surface of said component laden with said solid deposits, wherein each of said solid deposits has at least one functional site selected from the group consisting of (1) an acidic site to which an inorganic cation is sorbed, (2) a basic site to which an inorganic anion is sorbed, and (3) combinations thereof, for effecting selective sorption of said mixture of volatile amines by said solid deposits and displacing said inorganic cation, anion or combinations thereof; and providing thermal cycling having a temperature ranging, for at least one cycle, from greater than or equal to about 0° C. to less than or equal to about 550° C. for effecting at least one cycle of sorption and one cycle of desorption of said mixture of volatile amines wherein the rate of said desorption of said mixture of volatile amines exceeds the rate of diffusion of said mixture of volatile amines from said porous solid deposit for controlling and removing said porous solid deposits from said surface of said component.

15. A method for controlling and removing solid deposits from a surface of at least one component of a steam generating system laden with said solid deposits wherein said solid deposits are porous and are formed from an impurity introduced into said steam generating system and wherein said steam generating system produces megawatts of energy, said method comprises:

adding to an aqueous phase of said steam generating system an effective amount of a blend of volatile amines having a pKa value greater than about 10.61 at 25° C. and selected from the group consisting of an alkyl amine, a cyclo alkyl amine, and derivatives thereof, to form an aqueous phase having said blend of volatile amines, said effective amount being the amount of said blend of volatile amines necessary for controlling and removing said solid deposits from said surface of at least one component of said steam generating system, said removing of solid deposits does not require dissolution of said solid deposits;

converting said aqueous phase having said blend of volatile amines to a steam phase having said blend of volatile amines, wherein said steam phase is selected from the group consisting of wet steam, saturated steam and superheated steam;

exposing said steam phase having said blend of volatile amines to said surface of said component laden with said solid deposits, wherein each of said solid deposits has at least one functional site selected from the group consisting of (1) an acidic site to which an inorganic cation is sorbed, (2) a basic site to which an inorganic anion is sorbed, and (3) combinations thereof, for effecting selective sorption of said blend of volatile amines by said solid deposits and displacing said inorganic cation, anion or combinations thereof; and providing thermal cycling having a temperature ranging, for at least one cycle, from greater than or equal to about 0° C. to less than or equal to about 550° C. for effecting at least one cycle of sorption and one cycle of desorption of said blend of volatile amines wherein the rate of said desorption of said blend of volatile amines exceeds the rate of diffusion of said blend of volatile amines from said porous solid deposit for controlling and removing said porous solid deposits from said surface of said component.

16. A method for controlling and removing solid deposits from a surface of at least one component of a steam generating system laden with said solid deposits wherein said solid deposits are porous and are formed from an impurity introduced into said steam generating system and wherein said steam generating system produces megawatts of energy, said method comprises:

adding to an aqueous phase of said steam generating system an effective amount of at least one volatile amine having a pKa value greater than about 10.61 at 25° C. and selected from the group consisting of an alkyl amine, a cyclo alkyl amine, and derivatives thereof, to form an aqueous phase having said at least one volatile amine, said effective amount being the amount of said at least one volatile amine necessary for controlling and removing said solid deposits from said surface of at least one component of said steam generating system, said removing of solid deposits does not require dissolution of said solid deposits;

converting said aqueous phase having said at least one volatile amine to a steam phase having said at least one volatile amine, wherein said steam phase is selected from the group consisting of wet steam, saturated steam and superheated steam;

exposing said steam phase having said at least one volatile amine to said surface of said component laden with said solid deposits, wherein each of said solid deposits has at least one functional site selected from the group consisting of (1) an acidic site to which an inorganic cation is sorbed, (2) a basic site to which an inorganic anion is sorbed, and (3) combinations thereof, for effecting selective sorption of said at least one volatile amine by said solid deposits and displacing said inorganic cation, anion or combinations thereof; and providing thermal cycling having a temperature ranging, for at least one cycle, from greater than or equal to about 0° C. to less than or equal to about 550° C. for effecting at least one cycle of sorption and one cycle of desorption of said at least one volatile amine wherein the rate of said desorption of said at least one volatile amine exceeds the rate of diffusion of said at least one volatile amine from said porous solid deposit for controlling and removing said porous solid deposits from said surface of said component, and wherein enhanced corrosion protection results in said steam generating system.

17. The method of claim 16 including wherein said at least one volatile amine is selected from a group consisting of dimethylamine, mono-N-butylamine, monomethylamine, monoisopropylamine, tri-N-propylamine, monoethylamine, trimethylamine, triethylamine, diisobutylamine, 1,8 diaminooctane, 1,6 diaminohexane, 1,5 diaminopentane, trimethyleneimine, di-N-propylamine, diethylamine, ethyl-N-butylamine, piperidine, quinuclidine, tetramethyl-iminobis-propylamine, pyrrolidine, di-N-butylamine, diisopropylamine, dimethyl-amino-propylamine, N-ethylcyclohexylamine, and 1,5 diazabicyclo5.4.0undec-5-ene.

18. The method of claim 16 including wherein said at least one volatile amine is dimethylamine and pyrrolidine.

* * * * *

UNITED STATES PATENT AND TRADEMARK OFFICE
CERTIFICATE OF CORRECTION

PATENT NO. : 6,017,399
DATED : January 25, 2000
INVENTOR(S) : Billy Dean Fellers, Sr., et al.

It is certified that error appears in the above-identified patent and that said Letters Patent is hereby corrected as shown below:

Column 5 Line 11 "deposits,;" should read --deposits,--.

Column 5 Line 43 "system-which" should read --system which--.

Signed and Sealed this

Fourteenth Day of November, 2000

*Attest:*

Q. TODD DICKINSON

*Attesting Officer*     *Director of Patents and Trademarks*